United States Patent [19]

Lizell

[11] Patent Number: 5,154,263

[45] Date of Patent: Oct. 13, 1992

[54] METHOD AND APPARATUS FOR CONTROLLING THE FLOW OF DAMPING FLUID THROUGH A PISTON

[75] Inventor: Magnus B. Lizell, Danderyd, Sweden

[73] Assignee: Monroe Auto Equipment Company, Monroe, Mich.

[21] Appl. No.: 625,835

[22] Filed: Dec. 11, 1990

[51] Int. Cl.⁵ .................. F16F 9/50; B60G 17/08
[52] U.S. Cl. ......................... 188/299; 188/319; 280/707
[58] Field of Search ............ 188/286, 299, 285, 319, 188/282; 280/707

[56] References Cited

U.S. PATENT DOCUMENTS

| | | | |
|---|---|---|---|
| 3,194,162 | 7/1965 | Williams. | |
| 4,031,989 | 6/1977 | Blazquez | 188/299 |
| 4,593,658 | 6/1986 | Moloney | 123/90.11 |
| 4,597,411 | 7/1986 | Lizell | 137/493.8 |
| 4,729,459 | 3/1988 | Inagaki et al. | 188/299 |
| 4,796,911 | 1/1989 | Kuroki et al. | 280/707 X |
| 4,923,038 | 5/1990 | Lizell | 188/299 |
| 4,943,083 | 7/1990 | Groves et al. | 188/299 X |
| 4,948,163 | 8/1990 | Kikushima et al. | 188/299 X |
| 4,949,989 | 8/1990 | Kakizaki et al. | 188/299 X |
| 4,961,483 | 10/1990 | Yamaoka et al. | 188/299 |
| 4,984,819 | 1/1991 | Kazizaki et al. | 188/299 X |

FOREIGN PATENT DOCUMENTS

| | | |
|---|---|---|
| 0123365 | 10/1984 | European Pat. Off. . |
| 1095506 | 6/1955 | France . |
| 57-173629 | 10/1982 | Japan . |
| 57-182506 | 11/1982 | Japan . |
| 61-13041 | 1/1986 | Japan . |
| 147683 | 5/1985 | United Kingdom . |

Primary Examiner—Joseph F. Peters, Jr.
Assistant Examiner—Carla Mattix
Attorney, Agent, or Firm—Harness, Dickey & Pierce

[57] ABSTRACT

A shock absorber for damping the movement of the body of an automobile. The shock absorber includes a pressure cylinder forming a working chamber with a piston disposed therein. The piston has a plurality of flow passages extending therethrough. A first valve disk is located on one surface of the piston, while the second valve disk is located on the second surface of the piston. Finally, an electromechanical transducer is disposed adjacent to the first valve disk so as to permit control of flow of damping fluid through the piston.

37 Claims, 3 Drawing Sheets

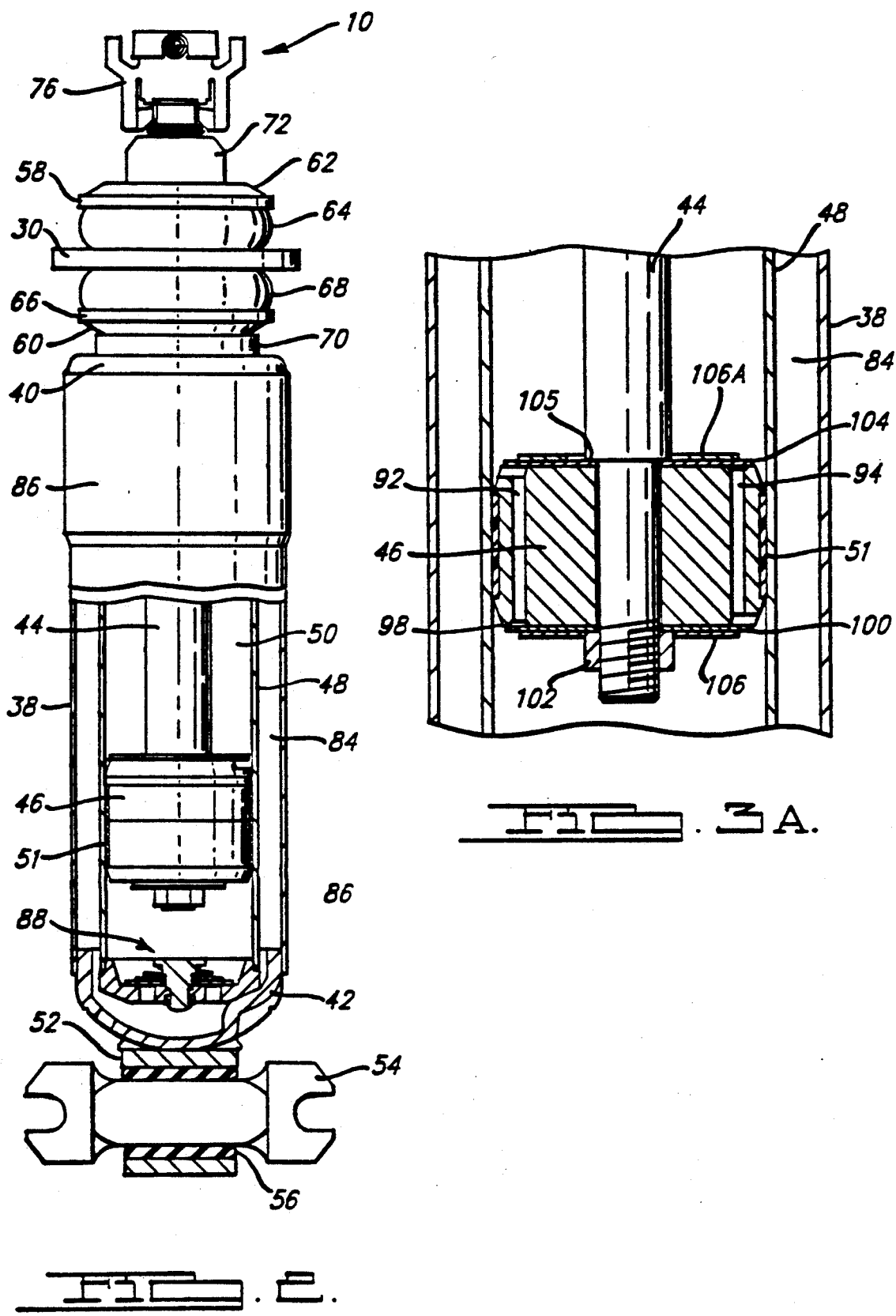

METHOD AND APPARATUS FOR CONTROLLING THE FLOW OF DAMPING FLUID THROUGH A PISTON

BACKGROUND OF THE INVENTION

1. Field of the Invention

This invention relates to suspension systems for automobiles and machines which receive mechanical shock, and more particularly to a method and apparatus for controlling the flow of damping fluid through a piston of a shock absorber.

2. Description of Related Art

Shock absorbers are used in connection with automotive suspension systems to absorb unwanted vibrations which occur during driving. To dampen unwanted vibrations, shock absorbers are generally connected between the body and the suspension of the automobile. A piston assembly is located within the shock absorber and is connected to the body of the automobile through a piston rod. Because the piston assembly is able to limit the flow of damping fluid within the working chamber of the shock absorber when the shock absorber is compressed or extended, the shock absorber is able to provide a damping force which "smooths" or "dampens" vibrations transmitted from the suspension to the body.

The greater the degree to which the flow of damping fluid within the working chamber is restricted by the piston assembly, the greater the damping forces which are provided by the shock absorber. Accordingly, a "soft" compression and rebound stroke is produced when the flow of damping fluid in the working chamber is relatively unrestricted. In contrast, a "firm" compression and rebound stroke is produced when there is an increased restriction in the flow of damping fluid in the working chamber.

In selecting the amount of damping that a shock absorber is to provide, three vehicle performance characteristics are often considered: ride comfort, vehicle handling and road holding ability. Ride comfort is often a function of the spring constant of the main springs of the vehicle, as well as the spring constant of the seat, tires, and the damping of the shock absorbers. Vehicle handling is related to the variation in the vehicle's attitude (i.e., roll, pitch and yaw). For optimum vehicle handling, relatively large damping forces are required to avoid excessively rapid variation in the vehicle's attitude during cornering, acceleration, and deceleration. Road holding ability is generally a function of the amount of contact between the tires and the ground. To optimize road holding ability, large damping forces are required when driving on irregular surfaces to prevent loss of contact between the wheels and the ground for an excessive period of time.

Because different driving characteristics depend on the amount of damping forces the shock absorber provides, it is often desirable to have a shock absorber in which the amount of damping forces generated by the shock absorber is adjustable. One method for selectively changing the damping characteristics of a shock absorber is disclosed in European Patent Application Publication No. 0 186 908 A2. In European Patent Application Publication No. 0 186 908 A2, a controller detects the distance between the body of the automobile and the front wheel so as to determine the contour of the surface. A rotary valve in each of the rear shock absorbers is then adjusted so that the rear shock absorbers are able to provide the desired amount of damping forces.

Another method for selectively changing the damping characteristics of a shock absorber is disclosed in PCT International Publication No. WO 88/06983. In PCT International Publication No. WO 88/06983, the shock absorber has a solenoid which controls the flow of damping fluid into pressure chambers which are located adjacent to valve disks which control the damping characteristics of the shock absorber. Upon movement of the plunger of the solenoid, the pressure in these pressure chambers changes so that the damping characteristics of the shock absorber may be varied.

SUMMARY OF THE INVENTION

Accordingly, it is a primary object of the present invention to provide a method and apparatus for controlling the flow of damping fluid through the piston of a shock absorber which is able to permit simultaneous damping of the movement of the body of an automobile as well as the movement of the wheels and axles of the vehicle.

Another object of the present invention is to provide a method and apparatus for controlling the flow of damping fluid through the piston of a shock absorber which is able to counteract tendencies of an automobile to roll, pitch or yaw during turning, acceleration, or braking.

It is a further object of the present invention to provide a method and apparatus for controlling the flow of damping fluid through the piston of a shock absorber which is able to provide an acceptable level of friction between the road surface and the tire of an automobile so as to maintain the braking and deceleration capability of the automobile.

Another object of the present invention is to provide a method and apparatus for controlling the flow of damping fluid through the piston of a shock absorber which is able to generate an adjustable damping characteristic for the body of an automobile in response to different driving environments and different driving habits.

A further object of the present invention is to provide a new and improved direct acting hydraulic shock absorber having a high degree of flexibility with respect to installation on different models of automobiles. In this regard, a related object of the present invention is to provide an apparatus for controlling the flow of damping fluid through the piston of a shock absorber which is relatively low in cost and relatively easy to maintain.

Yet another object of the present invention is to provide a shock absorber, as described above, in which the damping forces are controlled by a computer which is responsive to the pressure differential between two portions of the working chamber of the shock absorber.

BRIEF DESCRIPTION OF THE DRAWINGS

Other objects of the present invention will become apparent to one skilled in the art upon reading the following specification and by reference to the following drawings in which:

FIG. 2 is the schematic representation of the shock absorber using the method and apparatus for controlling the flow of damping fluid through the piston of a shock absorber according to the teachings of the first preferred embodiment of the present invention;

FIGS. 3A and 3B are cross-sectional views of the piston shown in FIG. 2 according to the teachings of the first preferred embodiment of the present invention.

DESCRIPTION OF THE PREFERRED EMBODIMENTS

Figure 1:
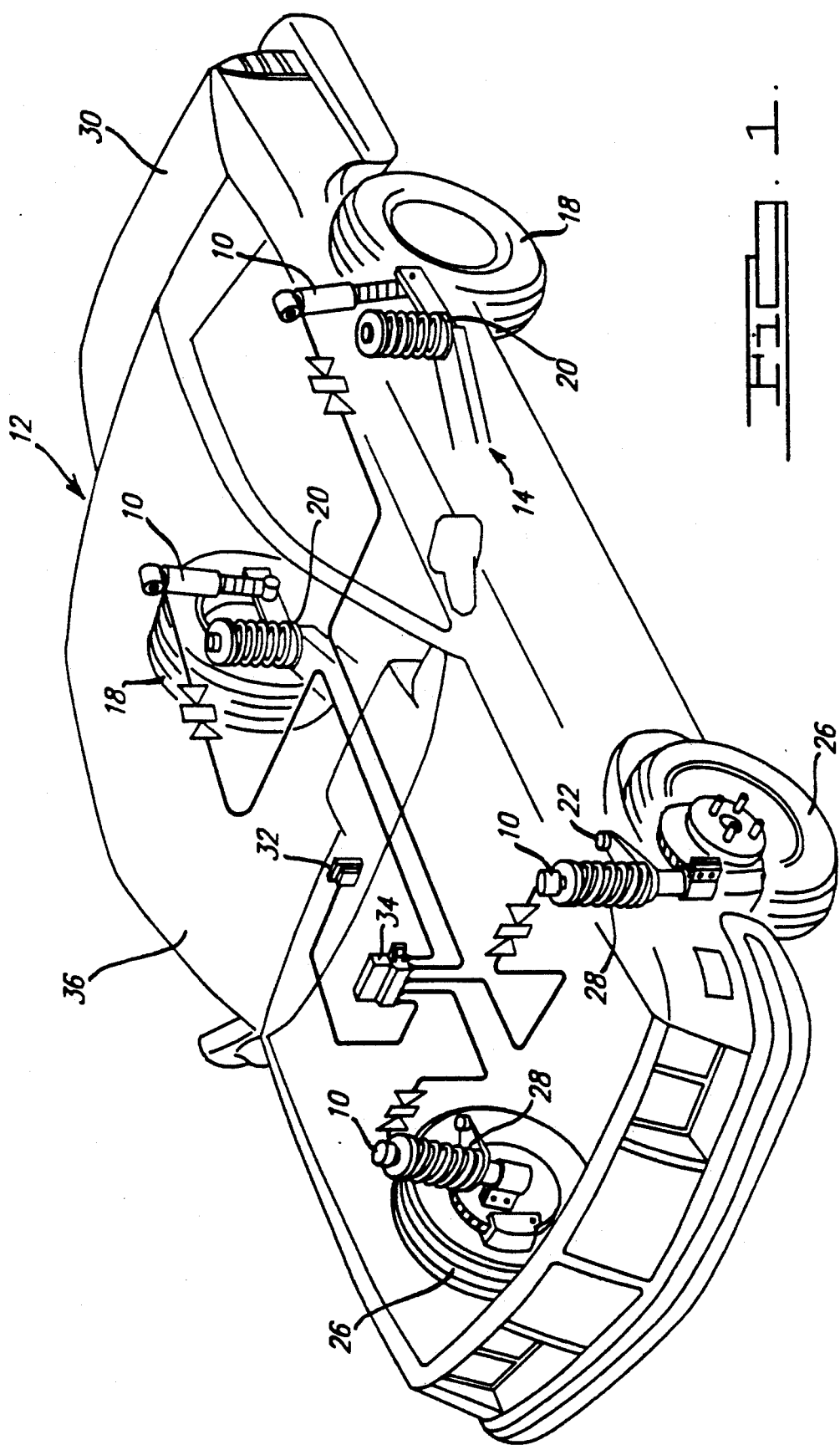
FIG. 1 is an illustration of an automobile using the method and apparatus for controlling the flow of damping fluid through the piston of a shock absorber according to the teachings of the preferred embodiment of the present invention.

Referring to FIG. 1, a plurality of four shock absorbers 10 according to the preferred embodiment of the present invention are shown. The shock absorbers 10 are depicted in operative association with a diagrammatic representation of a conventional automobile 12. The automobile 12 includes a rear suspension system 14 having a transversely extending rear axle assembly (not shown) adapted to operatively support the vehicle's rear wheels 18. The rear axle assembly is operatively connected to the automobile 12 by means of a pair of shock absorbers 10 as well as by the helical coil springs 20. Similarly, the automobile 12 has a front suspension system 22 including a transversely extending front axle assembly (not shown) to operatively support the front wheels 26. Front axle assembly is operatively connected to the automobile 12 by means of a second pair of shock absorbers 10 and by the helical coil springs 28.

The shock absorbers 10 serve to damp the relative movement of the unsprung portion (i.e., the front and rear suspension systems 22 and 14) and the sprung portion (i.e., the body 30) of the automobile 12. While the automobile 12 has been depicted as a passenger car, the shock absorber 10 may be used with other types of automotive vehicles or in other types of applications. Further, the term "shock absorber" as used herein will refer to shock absorbers in the general sense of the phrase and will include MacPherson struts. In addition, the shock absorbers 10 may be used with other types of suspension systems as well.

To allow the damping characteristics of the shock absorbers 10 to be controlled, a mode select switch 32 and an electronic control module 34 are provided. The mode select switch 32 is located within the passenger compartment 36 of the automobile 12 and is accessible by the occupants of the automobile 12. The mode select switch 32 is used for selecting which type of damping characteristics the shock absorbers 10 are to provide (i.e., firm, soft or automatic). The electronic control module 34 receives the output from the mode select switch 32 and is used for generating electronic control signals for controlling damping characteristics of the shock absorbers 10. By controlling the damping characteristics of the shock absorbers 10, the shock absorbers 10 are able to dampen relative movement between the body 30 and the suspension of the automobile 12 in such a manner as to optimize both ride comfort and road handling ability simultaneously.

The structure of the shock absorbers 10 will now be described with reference to FIG. 2. The shock absorber 10 comprises an elongated reserve tube 38 which engages a cup-shaped oil cap 40 at the upper end of the reserve tube 38. The reserve tube 3B also engages a base cup 42 at the lower end of the reserve tube 38 so as to form a chamber which is able to store damping fluid. Extending axially through the oil cap 40 is a piston rod 44 which is secured to a reciprocating piston assembly 46 at the lower end of the piston rod 44. The piston assembly 46 is axially displaceable within an elongated tubular pressure cylinder 48 which is located within the reserve tube 38. The pressure cylinder 48 defines a working chamber 50 in which the upper portion of the working chamber 50 is located above the piston assembly 46, while the lower portion of the working chamber 50 is located below the piston assembly 46. Disposed between the piston assembly 44 and the pressure cylinder 48 is a Teflon sleeve 51 which is used to facilitate movement of the piston assembly 46 with respect to pressure cylinder 48.

To connect the shock absorber 10 to the rear axle assembly of the automobile 12, the shock absorber 10 comprises a circular end fitting 52. The circular end fitting 52 is secure to the base cup 42 of the shock absorber 10 by a suitable means such as welding. Within the circular end fitting is disposed a mounting pin 54 disposed within a bushing 56 which is adapted to engage the axle assembly of the automobile 12. It will be appreciated that the specific type of end fitting may vary depending upon the environment in which the shock absorber 10 is used.

To connect the shock absorber 10 to the body 30 of the automobile 12, a first retainer 58 and a second retainer 60 are provided. The first retainer 58 and the second retainer 60 are disk shaped and have a central aperture operable to receive the piston rod 44. The first retainer 58 is disposed above the body 30, while the second retainer 60 is disposed below the body 30. The first retainer 58 has an upwardly facing annular indentation 62 which is able to accommodate a first disk-shaped cushion 64 which is disposed between the body 30 of the automobile 12 and the first retainer 58. Similarly, the second retainer 60 has a downwardly facing annular indentation 66 which is operable to receive a second disk-shaped cushion 68 which is disposed between the body 30 of the automobile 12 and the second retainer 60. The second retainer 60 is positionally secured in part by means of an annular spacer 70 which is disposed around the piston rod 44 immediately above the oil cap 40.

The shock absorber 10 further comprises a self-locking nut 72 which is disposed on the piston rod 44 immediately above the first retainer 58. The self-locking nut 72 has an internally threaded bore which is able to threadably engage the threaded upper end portion of the piston rod 44. Accordingly, by rotating the self-locking nut 72 on the upper portion of the piston rod 44, both the first retainer 58 and the first cushion 64 are displaced in a direction toward the body 30 of the automobile 12.

To permit electrical communication between the electronic control module 34 and the shock absorber 10, the shock absorber 10 further comprises an electrical connector assembly 76. The electrical connector assembly 76 allows for rapid electrical decoupling of the shock absorber 10 from the electronic control module 34 so that the shock absorber 10 may be replaced. The electrical connector assembly 76 may be of the type which is shown in U.S. Ser. No. 377,236 filed on Jul. 7, 1989, though other suitable electrical connectors may be used.

To support the piston rod 44 within the working chamber 50 as well as to provide unidirectional flow of damping fluid through the damping fluid reservoir 84, a rod guide/valve assembly 86 is provided. The rod guide/valve assembly 86 allows fluid flow during compression of the shock absorber 10, while preventing the flow of damping during rebound of the shock absorber 10. The rod guide/valve assembly 86 may be of the type which is shown and described in U.S. Ser. No. 322,542 filed Mar. 13, 1989, now U.S. Pat. No. 4,955,460, which is hereby incorporated by reference. However, it is to be understood that other suitable rod guide/valve assemblies may be used.

To allow damping fluid in the damping fluid reservoir 84 to flow into the working chamber 50, a base valve assembly 88 is provided. The base valve assembly 88 allows damping fluid to flow from the damping fluid reservoir 84 into the pressure cylinder 48 during rebound of the piston assembly 46. However, the base valve assembly 88 prevents the flow of damping fluid from the pressure cylinder 48 to the damping fluid reservoir 84 during compression of the shock absorber 10. Accordingly, the base valve assembly 88, in conjunction with the rod guide/valve assembly 86, permit unidirectional flow of damping fluid through the damping fluid reservoir 84.

Damping forces are generated in the shock absorber 10 by movement of the piston assembly 46 which is secured to the piston rod 44. As shown in FIGS. 3 and 4, the piston assembly 48 comprises a piston 90 having a first plurality of flow passages 92 and a second plurality of flow passages 94. The first plurality of flow passages 92 extends from the upper surface 96 of the piston 90 to the lower surface 98 of the piston 90. To restrict the flow of damping fluid through the first plurality of flow passages 92, a first valve disk 100 is provided. The first valve disk 100 is disposed adjacent to the lower surface 98 of the piston 90 adjacent to the lower portion of the first plurality of flow passages 92. Accordingly, the first valve disk 100 prevents the flow of damping fluid flowing through the first plurality of flow passages 92 during compression of the shock absorber 10, while restricting the flow of damping fluid through the first plurality of flow passages 92 during rebound of the shock absorber 10. The first valve disk 100 is secured to the lower surface 98 of the piston 90 by a piston nut 102. The piston nut 102 has an internally threaded bore which threadedly engages the lower end portion of the piston rod 44 thereby securing the first valve disk 100 to the piston 90, as well as securing the piston 90 to the piston rod 44.

As will be appreciated by those skilled in the art, the amount of restriction to the flow of damping fluid through the first plurality of flow passages 92 by the first valve disk 100 depends on the deflective rigidity of the first valve disk 100. For example, the if the first valve disk 100 has high deflective rigidity, a higher pressure drop will be generated when damping fluid flows through the first plurality of flow passages 92 during rebound. In contrast, if the first valve disk 100 has low deflective rigidity, a lower pressure drop will be generated when damping fluid flows through the first plurality of flow passages 92.

To control the flow of damping fluid through the second plurality of flow passages 92, a second valve disk 104 is provided. The second valve disk 104 is located on the upper surface 96 of the piston 90 adjacent to the upper end of the second plurality of flow passages 94. Accordingly, the second valve disk 104 prevents the flow of damping fluid through the second plurality of flow passages 94 during rebound of the shock absorber 10, while restricting the flow of damping fluid through the second plurality of flow passages 94 during compression of the shock absorber 10. Again, those skilled in the art will realize that the biasing force exerted on the second valve disk 104 against the upper surface of the piston 90 will control the amount of restriction to the flow of damping fluid through the second plurality of flow passages 94 during compression. The second valve disk is secured to the upper surface of the piston 90 by an annular shoulder 105 which is disposed on the piston rod 44 at a position immediately above the piston assembly 44.

To control the deflective rigidity of the first valve disk 100, a piezoelectric element 106 is provided. The piezoelectric element 106 is fixedly secured to the lower surface of the first valve disk 100 by means of an adhesive. The piezoelectric element 106 is annular in shape and has an inner and outer radii, with the thickness of the piezoelectric element 106 being less than the distance between the inner and outer radii.

When an electrical signal is delivered to the piezoelectric element 106, the outer radius of the piezoelectric element 106 decreases while there is a corresponding increase in the thickness of the piezoelectric element 106. Because of this geometric change in the shape of the piezoelectric element 106, the piezoelectric element 106 exerts a bending force on the first valve disk 100 which causes a change the deflective rigidity of the first valve disk 100.

Accordingly, when no electrical signal is delivered to the piezoelectric element 106, the piezoelectric element 106 exerts little, if any force, on the first valve disk 100. When this occurs, flow through the first plurality of flow passages 92 is restricted only by the deflective rigidity of the first valve disk 100. Relatively large rebound forces are therefore generated since the flow of damping fluid through the first plurality of flow passage 92 is relatively highly restricted by the first valve disk 100. When an electrical signal is delivered to the piezoelectric element 106, the piezoelectric element 106 causes the deflective rigidity of the first valve disk 100 to decrease by exerting a bending force on the first valve disk 100. Accordingly, relatively low damping forces are generated during rebound since only a low pressure is needed to deflect the valve disk 100.

To control the damping forces generated during compression, the upper surface 96 of the piston 90 has a piezoelectric electric element 106A which is fixedly secured to the upper surface of the second valve disk 104 by means of an adhesive. As with the piezoelectric element 106, the piezoelectric element 106A is annular in shape and has an inner and outer radii, with the thickness of the piezoelectric element 106A being less than the distance between the inner and outer radii.

When an electrical signal is delivered to the piezoelectric element 106A, the outer radius of the piezoelectric element 106A decreases while there is a corresponding increase in the thickness of the piezoelectric element 106A. Because this geometric change in shape of the piezoelectric element 106A, the piezoelectric element 106A exerts a bending force on the second valve disk 104. This force on the second valve disk 104 causes a change in the deflective rigidity of the second valve disk 104 so as to cause the second valve disk 104 to be biased in an upward direction. Because the piezoelectric element 106A causes the second valve disk 104 to be biased in an upward direction, there is less restriction to the flow of damping fluid through the second plurality of flow passages 94 during compression so as to produce a soft compression stroke.

Figure 3B:
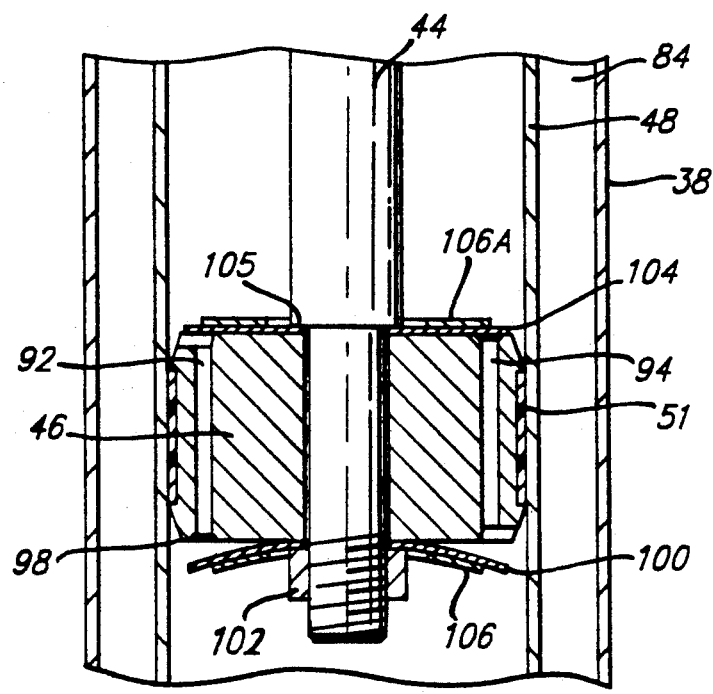
Figure 4:
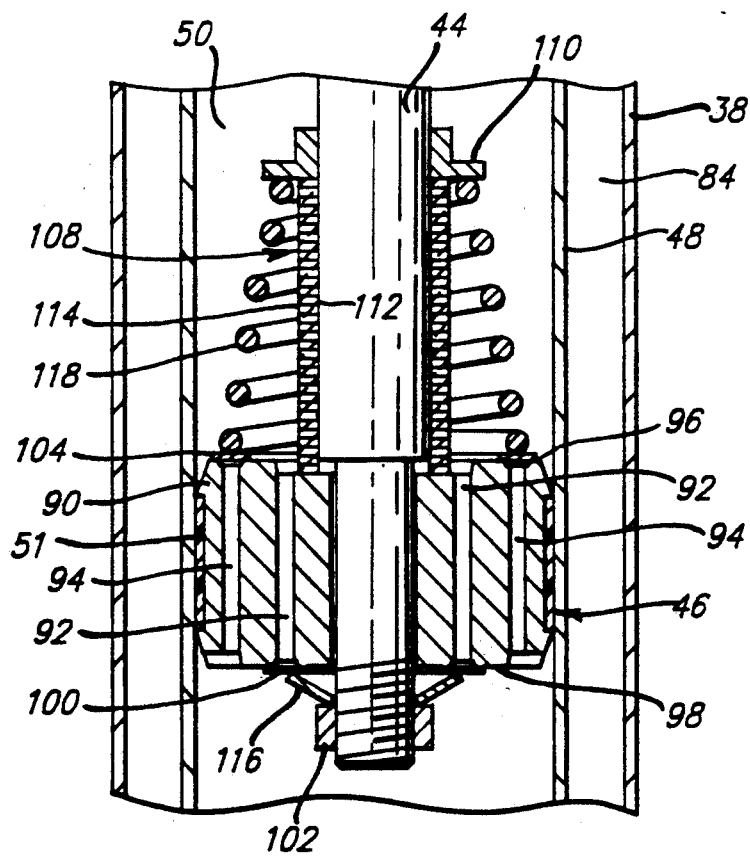
FIG. 4 is a cross-sectional view of the piston shown in FIG. 2 according to the teachings of the second preferred embodiment of the present invention.

As shown in FIG. 3B, the piezoelectric element 106A disposed on the second valve disk 104 is used in conjunction with the piezoelectric element 106 disposed on the first valve disk 100 to control the flow of damping fluid during both compression and rebound. In this regard, the reflective rigidity of the first valve disk 100 will depend on the electrical signal delivered to the piezoelectric element 106, while the deflective rigidity of the second valve disk 104 is determined by the electrical signal delivered to the piezoelectric element 106A. Accordingly, by varying the electrical signal delivered to the piezoelectric element 106, the rebound forces generated by the piston assembly 46 can be varied. Similarly, by varying the electrical signal delivered to the piezoelectric element 106A, the compressive forces generated by the piston assembly 46 can be varied.

The second preferred embodiment of the present invention will now be described with reference to FIG. 4. The elements of the second preferred embodiment which are similar to those associated with the first preferred embodiment shown in FIGS. 2 and 3 and contain the same reference numerals when used in FIG. 4. The second preferred embodiment of the present invention includes a stack of piezoelectric elements 108 (hereinafter "piezoelectric stack 108"). The piezoelectric stack 108 extends from the upper surface 96 of the piston 90 in an upward direction to an annular spring support member 110 which prevents upward movement of the piezoelectric stack 108. The piezoelectric stack 108 is annular in shape and has a radial inner surface 112 and a radial outer surface 114, with the radial inner surface 112 being disposed adjacent to the piston rod 44.

To provide means for biasing the upper surface 96 of the piston 90 against the piezoelectric stack 108, a Belleville spring disk 116 is provided which is disposed between the piston nut 102 and the first spring disk 100. The Belleville spring disk 116 is used to generate a biasing force on the first valve disk 100 as well as to cause the upper surface of the piston 90 to be biased against the piezoelectric stack 108. Because the Belleville spring disk 116 is able to compress to a limited extent upon rebound of the shock absorber 10, the piston 90 is able to slide to a limited extent on the piston rod 44 during operation of the shock absorber 10. Furthermore, the piston assembly 46 also comprises a helical spring 118. The helical spring 118 is disposed coaxially around the piston rod 44 at a position immediately above the piston assembly 46. The upper end of the helical spring 118 is disposed adjacent to the annular spring support member 110 while the lower end of the helical spring 118 is disposed against the second spring disk 104. Accordingly, the helical spring 118 is able to exert a downward biasing force on the second spring disk 104.

Because the piston 90 is able to slide on the piston rod 44, the force exerted on the piezoelectric stack 108 may change as the piston 90 moves on the piston rod 44. For example, when the shock absorber 10 is in rebound, the piston 90 moves in a downward direction relative to the piston rod 44 thereby compressing the Belleville spring disk 110 and reducing the force exerted by the piston 90 on the piezoelectric stack 108. When the shock absorber 10 is in compression, the piston 90 moves in upward direction relative to the piston rod 44 thereby increasing the force on the piezoelectric stack 108. Because the piezoelectric stack 108 is able to generate electrical signals in response to forces exerted on it by the piston 90, the electrical output of the piezoelectric stack 108 may be used to detect the forces acting on the piston 90.

Furthermore, because the geometric shape of the piezoelectric stack 108 changes upon the application of an electrical signal, the piezoelectric stack 108 may also be used to change the damping characteristics of the shock absorber 10. This is because an electrical signal which is delivered to the piezoelectric stack 108 causes its geometric shape to change. When the appropriate electrical signal is delivered to the piezoelectric stack 108 which causes the length of the piezoelectric stack 108 to increase, the piston 90 slides in a downward direction on the piston rod 44. This downward movement of the piston 90 increases the compressive forces generated by the Belleville spring disk 116 which act on a first valve disk 100. Accordingly, less damping fluid is able to flow through the first plurality of flow passages 92 thereby increasing the damping forces generated by the shock absorber 10 during rebound, while more damping fluid is able to flow through the second plurality of flow passages 94 thereby decreasing the damping forces generated by the shock absorber 10 during compression.

When an appropriate electrical signal is applied to the piezoelectric stack 108 which causes its length to decrease, the piston 90 moves in an upward direction thereby decreasing the compressive forces acting on the first valve disk 100 by the Belleville spring disk 116 while increasing the compressive forces acting on the second valve disk 104 by the helical spring 118. Accordingly, more damping fluid is able to flow through the first plurality of flow passages during rebound, thereby producing soft rebound forces, while less damping fluid is able to flow through the second plurality 94 of flow during compression so as to produce a firm compression stroke.

While it will be apparent that the preferred embodiments illustrated in here are well calculated to fill the objects stated above, it will be appreciated that the invention is susceptible to modification, variation without departing from the scope of the invention. For example, a computer may be used for controlling the application or recording of electrical signals generated by the piezoelectric elements. Such systems are disclosed in U.S. Pat. No. 4,923,038 and U.S. Ser. No. 322,543, filed Mar. 13, 1989, now U.S. Pat. No. 4,943,083. Other modifications are also with the scope of the following claims.

What is claimed is:

1. A shock absorber for damping the movement of the body of an automobile comprising:

a pressure cylinder forming a working chamber having first and second portions operable to store damping fluid;

a piston disposed within said pressure cylinder between said first and second portions of said working chamber, said piston having a plurality of flow passages extending between first and second surfaces of said piston;

first means for controlling the flow of damping fluid through said piston, said first means disposed on said first surface of said piston adjacent to said first portion of said working chamber;

second means for controlling the flow of damping fluid through said piston, said second means disposed on said second surface of said piston adjacent to said second portion of said working chamber; and an electromechanical transducer disposed adjacent to said first means for controlling the flow of damping fluid, said electromechanical transducer being in mechanical communication with said first means for controlling the flow of damping fluid and being operable to exert a force on said first means for controlling the flow of damping fluid upon receipt of an electrical signal so as to vary the flow of damping fluid though at least one of said flow passages.

2. The shock absorber of claim 1, wherein said first means for controlling the flow of damping fluid comprises a valve disk having a first surface mechanically communicating with said first surface of said piston, said valve disk further having a second surface mechanically communicating with said electromechanical transducer.

3. The shock absorber of claim 2, wherein said electromechanical transducer comprises a piezoelectric element having a first surface mechanically communicating with said second surface of said valve disk.

4. The shock absorber of claim 3, wherein said piezoelectric element is annularly shaped and has inner and outer radii, the thickness of said piezoelectric element being less than the distance between said inner and outer radii.

5. The shock absorber of claim 4, wherein said outer radius of the piezoelectric element is disposed proximate to the outer periphery of said valve disk.

6. The shock absorber of claim 5, wherein said piezoelectric element is operable to change the deflective rigidity of said valve disk.

7. The shock absorber of claim 6, wherein said outer radius of said piezoelectric element decreases upon receipt of said electrical signal thereby changing the deflective rigidity of said valve disk.

8. A shock absorber for damping the movement of the body of an automobile comprising:
a pressure cylinder forming a working chamber having first and second portions operable to store damping fluid;
a piston disposed within said pressure cylinder between said first and second portions of said working chamber, said piston having a plurality of flow passages extending between first and second surfaces of said piston;
first means for controlling the flow of damping fluid through said piston, said first means disposed on said first surface of said piston adjacent to said first piston of said working chamber;
second means for controlling the flow of damping fluid through said piston, said second means disposed on said second surface of said piston adjacent to said second portion of said working chamber; and
an electromechanical transducer disposed adjacent to said second surface of said piston, said electromechanical transducer being able to exert a force on said second surface of said piston upon receipt of an electrical signal so as to vary the flow of damping through at least one of said flow passages.

9. The shock absorber of claim 8, further comprising a piston rod operable to slidably support said piston in said pressure cylinder.

10. The shock absorber of claim 9, wherein said first means for controlling the flow of damping fluid through said piston comprises a valve disk, said shock absorber further including means for biasing said valve disk against said first surface of said piston.

11. The shock absorber of claim 10, wherein said electromechanical transducer is operable to slidably move said piston upon receipt of said electrical signal so as to change the biasing force exerted on said valve disk by said means for biasing said valve disk.

12. The shock absorber of claim 11, wherein said electromechanical transducer comprises an annular stack of piezoelectric elements disposed on said second surface of said piston.

13. The shock absorber of claim 12, wherein said annular stack of piezoelectric elements has a radial inner surface and a radial outer surface, said radial inner surface of said stack of piezoelectric elements being disposed adjacent to said piston rod.

14. The shock absorber of claim 13, wherein said means for biasing said valve disk against said piston comprises a Belleville disk spring operable to bias said valve disk in a first direction, said annular stack of piezoelectric elements being operable to exert a force on said piston in a second direction opposing said first direction upon receipt of said electrical signal.

15. A shock absorber for damping the movement of the body of an automobile comprising:
a pressure cylinder forming a working chamber having first and second portions operable to store damping fluid;
a piston rod disposed within said pressure cylinder;
a piston slidably disposed on said piston rod between said first and second portions of said working chamber, said piston having a plurality of flow passages extending between first and second surfaces of said piston;
first means for controlling the flow of damping fluid through said piston, said first means being disposed on said first surface of said piston adjacent to said first portion of said working chamber;
second means for controlling the flow of damping fluid through said piston, said second means being disposed on said second surface of said piston adjacent to said second portion of said working chamber; and
an electromechanical transducer disposed adjacent to said second surface of said piston, said electromechanical transducer operable to generate an electrical signal in response to forces acting on said piston during movement of said piston in said pressure cylinder.

16. The shock absorber of claim 15, wherein said first means for controlling the flow of damping fluid through said piston comprises a valve disk, said shock absorber further including means for biasing said valve disk against said first surface of said piston.

17. The shock absorber of claim 16, wherein said electromechanical transducer is operable to generate said electrical signal in response to movement of said piston on said piston rod.

18. The shock absorber of claim 17, wherein said electromechanical transducer comprises an annular stack of piezoelectric elements disposed on said second surface of said piston.

19. The shock absorber of claim 18, wherein said annular stack of piezoelectric elements has a radial inner surface and a radial outer surface, said radial inner surface of said stack of piezoelectric elements being disposed adjacent to said piston rod.

20. The shock absorber of claim 19, wherein said means for biasing said first valve disk against said piston comprises a Belleville disk spring operable to bias said first valve disk in a first direction.

21. A method for regulating the flow of damping fluid between first and second portions of the working chamber of a direct acting hydraulic shock absorber disposed between the sprung and unsprung portions of a vehicle, said method comprising the steps of:
 locating an electromechanical transducer adjacent to a valve disk which is disposed within said first portion of said working chamber, said valve disk having first and second surfaces, said first surface of said valve disk mechanically communicating with said electromechanical transducer, said second surface of said valve disk being disposed adjacent to a piston having a plurality of flow passages disposed therein, the deflective rigidity of said valve disk being operable to control the flow of damping fluid through at least one of said flow passages;
 applying an electrical signal to said electromechanical transducer; and
 causing the deflective rigidity of said valve disk to change in response to said electrical signal thereby changing the pressure drop across said piston.

22. The method of claim 21, comprising the additional step of changing the shape of said electromechanical transducer in response to said electrical signal so as to change the defective rigidity of said valve disk.

23. The method of claim 22, wherein said electromechanical transducer comprises a piezoelectric element.

24. The method of claim 23, wherein said piezoelectric element is annularly shaped and has an inner and outer radii, and said step of changing the shape of said piezoelectric element comprises the step of decreasing the outer radii of said piezoelectric element upon receipt of said electrical signal.

25. The method of claim 24, wherein said piezoelectric element is disposed adjacent to the outer periphery of said valve disk.

26. The method of claim 25, wherein said step of locating an electromechanical transducer adjacent to a valve disk comprises the step of fixedly securing said piezoelectric element to said first surface of said valve disk by means of an adhesive.

27. A method for regulating the flow of damping fluid between first and second portions of the working chamber of a direct acting hydraulic shock absorber disposed between the sprung and unsprung portions of a vehicle, said method comprising the steps of:
 locating an electromechanical transducer adjacent to a piston having first and second surfaces, said first surface of said piston mechanically communicating with said electromechanical transducer, said second surface of said piston mechanically communicating with a valve disk disposed within said second portion of said working chamber, the deflective rigidity of said valve disk being operable to control the flow of damping fluid through at least one flow passage in said piston;
 applying an electrical signal to said electromechanical transducer; and
 causing the deflective rigidity of said valve disk to change in response to said electrical signal thereby changing the pressure drop across said one flow passage.

28. The method of claim 27, wherein said shock absorber further comprises a piston rod upon which said piston is slidably mounted.

29. The method of claim 28, comprising the additional step of causing said piston to slide on said piston rod upon the application of said electrical signal to said electromechanical transducer.

30. The method of claim 29, wherein said electromechanical transducer comprises an annular stack of piezoelectric elements disposed on said second surface of said piston.

31. The method of claim 30, wherein said annular stack of piezoelectric elements having a radially inner surface and a radially outer surface, said radially inner surface of said annular stack of piezoelectric elements being adjacent to said piston rod.

32. The method of claim 31, wherein said shock absorber comprises a Belleville disk spring operable to bias said valve disk in a first direction, said annular stack of piezoelectric elements exerting a force on said piston in a second direction opposing said first direction.

33. A method for determining the forces acting on a piston of a direct acting hydraulic shock absorber having a pressure chamber, said method comprising the steps of:
 locating a piston and a piston rod within said pressure chamber so as to divide said pressure, said piston being slidable on said piston rod and having first and second surfaces;
 locating an electromechanical transducer on the exterior of at least a portion of said piston rod adjacent to said second surface of said piston, said electromechanical transducer operable to generate an electrical signal in response to the force exerted on said electromechanical transducer by said piston;
 applying a biasing force on said piston so as to bias said piston against said electrical transducer; and
 recording the output of said electromechanical transducer during movement of said piston so as to indicate the forces acting on said piston.

34. The method of claim 33, wherein said step of applying a biasing force on said piston includes the step of disposing a Belleville spring disk proximate to said first surface of said piston so as to bias said piston against said electromechanical transducer.

35. The method of claim 34, wherein said electromechanical transducer is operable to slidably move said piston upon receipt of said electrical signal so as to change the biasing force exerted on said first valve disk by said means for biasing said first valve disk.

36. The method of claim 35, wherein said electromechanical transducer comprises an annular stack of piezoelectric elements, said annular stack of piezoelectric elements being disposed on said second surface of said piston.

37. The method of claim 35, wherein said annular stack of piezoelectric elements has a radial inner surface and a radial outer surface, said radial inner surface of said stack of piezoelectric elements being disposed adjacent to said piston rod.

* * * * *